May 7, 1957  F. L. BEDNARZ  2,791,153
WIDE ANGLE LENS SYSTEM
Filed Sept. 25, 1952  3 Sheets-Sheet 3

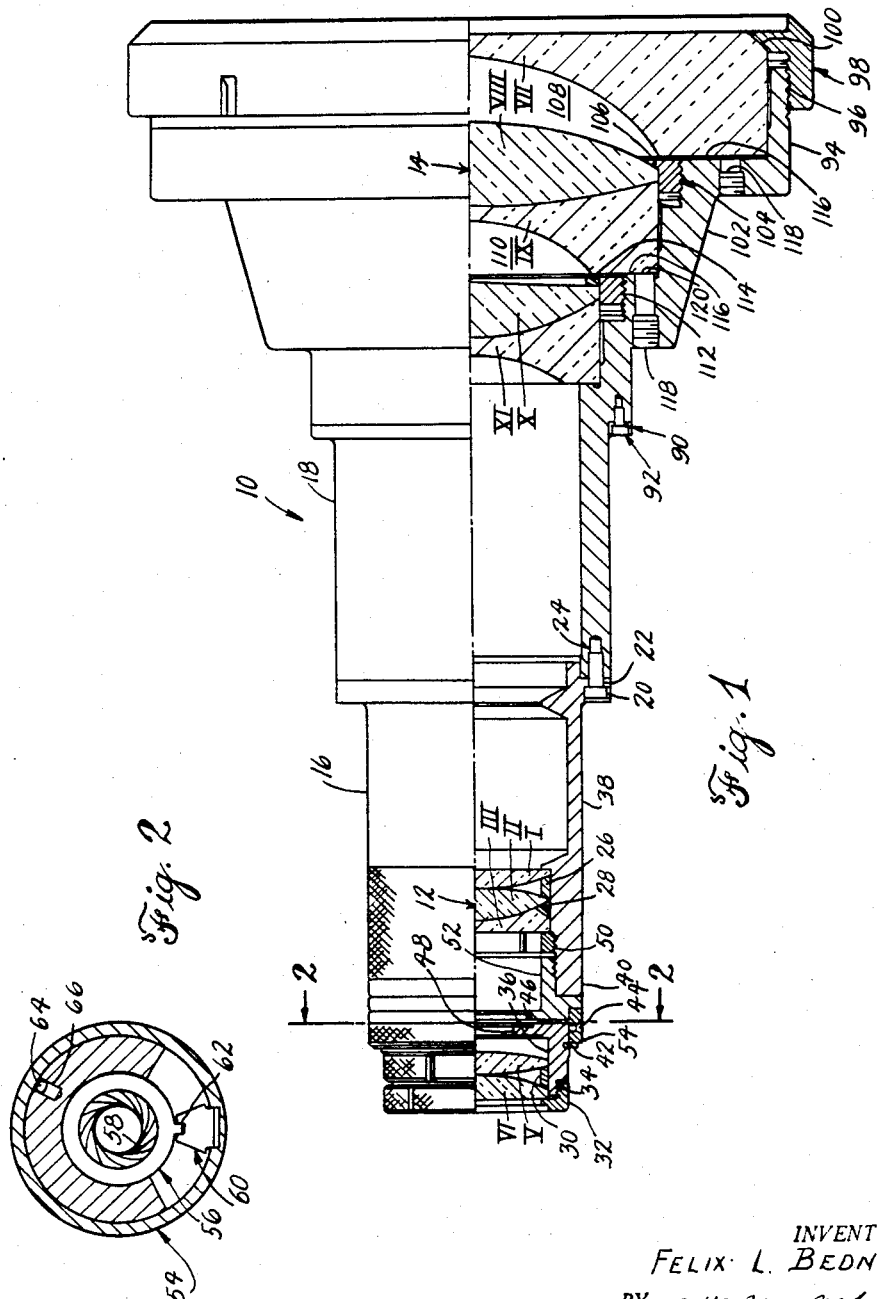

| | | | SPECIFICATIONS | |
|---|---|---|---|---|
| ELEMENT | $N_D$ | V | RADII | SEPARATION |
| I | 1.6086 | 58.9 | $R_1 = -20.000 \pm .030$ | $t_1 = .200 \pm .003$ |
| | | | $R_2 = -4.058 \pm .004$ | $s_1 = .004$ |
| II | 1.6086 | 58.9 | $R_3 = 2.796 \pm .0015$ | $t_2 = .430 \pm .003$ |
| | | | $R_4 = -2.337 \pm .001$ | $s_2 = .0215$ |
| III | 1.7195 | 29.2 | $R_5 = -2.240 \pm .001$ | $t_3 = .160 \pm .003$ |
| | | | $R_6 = \infty$ | $s_3 = 1.400$ |
| IV | 1.6880 | 31.0 | $R_7 = -25.000 \pm .030$ | $t_4 = .160 \pm .003$ |
| V | 1.6086 | 58.9 | $R_8 = 3.875 \pm .005$ | $t_5 = .300 \pm .003$ |
| | | | $R_9 = -7.000 \pm .008$ | $s_4 = .004$ |
| VI | 1.6086 | 58.9 | $R_{10} = 2.030 \pm .003$ | $t_6 = .300 \pm .003$ |
| | | | $R_{11} = 13.040 \pm .010$ | |

INVENTOR.
FELIX L. BEDNARZ
BY
ATTORNEYS

United States Patent Office 2,791,153
Patented May 7, 1957

2,791,153

WIDE ANGLE LENS SYSTEM

Felix L. Bednarz, Beverly Hills, Calif., assignor, by mesne assignments, to the United States of America as represented by the Secretary of the Navy Application September 25, 1952, Serial No. 311,445

7 Claims. (Cl. 88—57)

This invention relates to a wide angle lens system whereby an image is adapted to be projected upon a hemispherical screen of extremely large radius. In this manner a wider field of view is available to the observer.

An object of the invention, therefore, is to provide a device whereby a trainee or observer is able to view a projected image that covers a field angle considerably greater than that of the ordinary lens.

Another object of the invention is to provide a lens system that is capable of including a field angle that is from five to ten times as wide as the angle covered by a normal lens.

Another object of the invention is to provide a device where it is desirable to simulate human peripheral vision in a training operation.

And yet another object of the invention is to simulate actual conditions encountered by a gunner whereby he is able not only to find his objective if directly in front of him, but also is able to spot any objectives, on either side and directly overhead.

Still another object of the invention is to provide a lens system for photographic and projection purposes of wide field angle and high aperture throughout the field.

An important feature of the invention resides in the fact that the lens is suitable for use in both photography and projection as may be required.

Figures 3, 4:
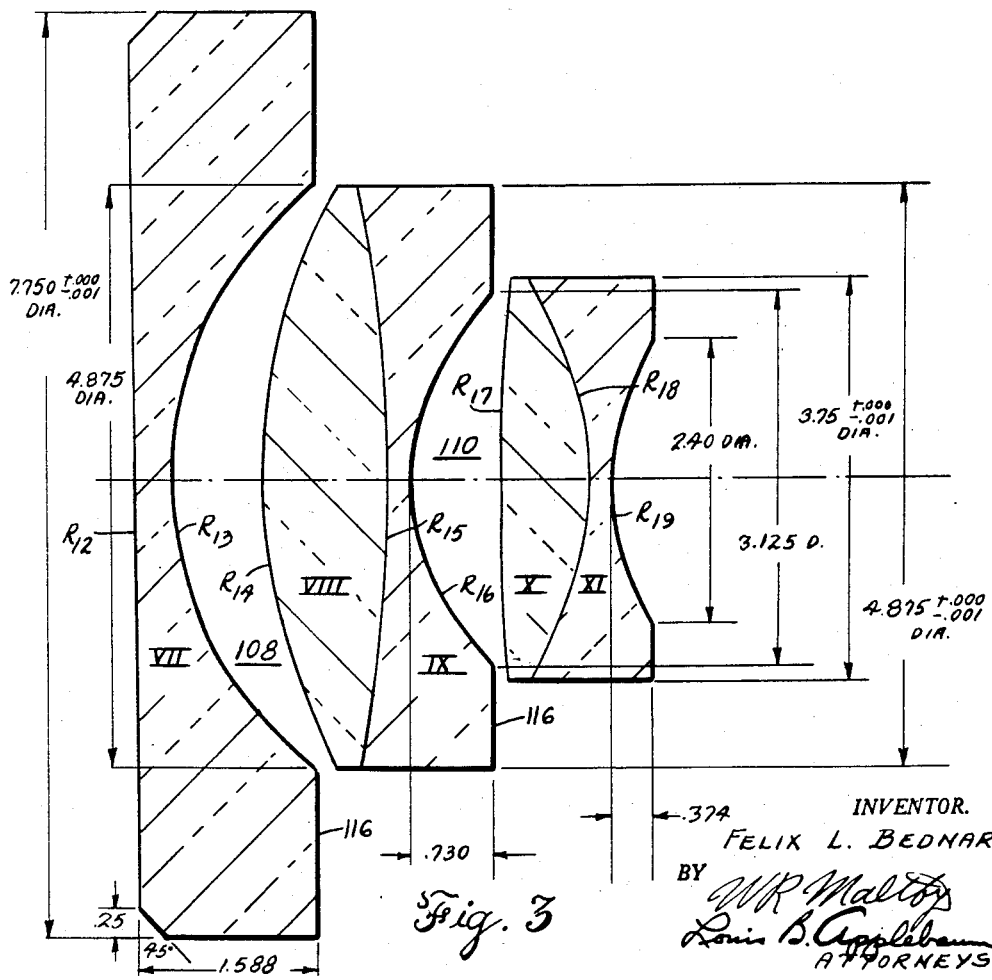
Figures 5, 6:
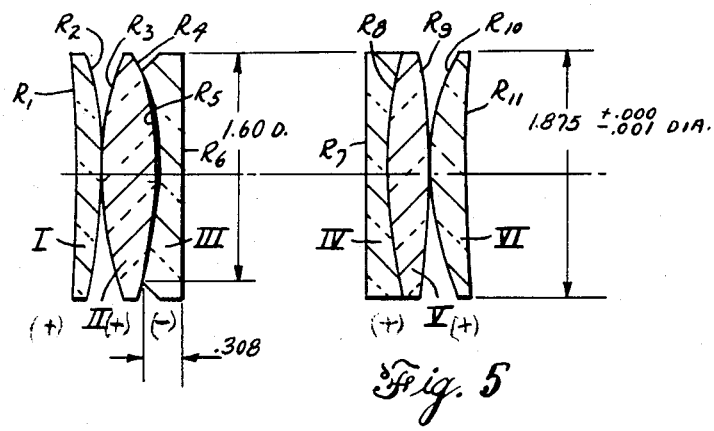

Other objects and many of the attendant advantages of this invention will be readily appreciated as the same becomes better understood by reference to the following detailed description when considered in connection with the accompanying drawings wherein:

Fig. 1 discloses the wide angle lens with the component parts in operative position, Fig. 2 is a vertical section taken on lines 2—2 of Fig. 1, and shows the method of operating the diaphragm, Fig. 3 illustrates the negative objective, Fig. 4 represents the data for the lens of Fig. 3, Fig. 5 illustrates the positive objective, and Fig. 6 represents the data for the lens of Fig. 5.

The device of the invention has its most valuable application in military training although it is obvious that any training requiring visual presentation would find it advantageous to employ the wide angle picture obtained by use of the lens about to be described. In usual visual presentation, an ordinary camera is used and the field angle available by the use of such lenses normally is limited to about 15 to 30 degrees. As a result, a limited presentation of simulated or real conditions can be projected. Training of this type is therefore inadequate to fully train the student whereby he is able to cope with the actual battle conditions. To overcome such limitations, the wide angle lens of the invention has been devised.

This lens system is designed to project an image onto a hemispherical or partly hemispherical screen of approximately 10 foot radius with the actual total field covered by the lens being a little more than 140 degrees. However, the lens is placed back of the center of the sphere a sufficient distance, generally about 3 feet, and as a result, the entire surface of the screen is covered by the image. Thus, an observer seated at the center of the sphere with his eyes on the equatorial line, such as would actually take place in nature, the viewing angle is a full 180 degrees in azimuth and 105 degrees in elevation (from directly overhead to 15 degrees below the equator). In this manner, the trainee is able to look both overhead and to either side in order to meet the problem flashing on the screen, under conditions more closely approaching that in actual experience. The lens of the invention has a field angle of 142° and the viewing angle will depend upon where the observer is placed. The less the distance between the arc of the hemispherical distance and the diameter thereof, the greater the viewing angle.

Obviously, many other training uses are adapted to be carried out. As a few examples, the lens may be used for training in ground maneuvers, ship manipulations, air-to-air training, testing reactions under simulated traffic hazards, or for any applications where it is desirable to simulate peripheral vision in a training operation.

The wide angle lens system is shown generally in Fig. 1 and is identified by the numeral 10. The lens components consist of a positive objective 12 and a spaced negative objective 14. The plane surface of the negative component faces the object or screen (not shown) and the positive component is nearest the film.

Wide angle lens assembly 10 includes a casing 16 to mount the positive objective lens 12 and a contiguous stepped casing 18 mounting lens 14, casings 16 and 18 being secured together in fixed, predetermined relation by means of headed retaining screws 20 extending through apertured flange 22 in casing 16 and received in aligned counterbores 24 in casing 18.

Positive lens components 12 are clearly illustrated in Figs. 1, 5 and 6 and comprises an arrangement of six lenses, mounted as indicated in Fig. 1. They consist of a concave convex lens I, spaced by a separator ring 26 from double convex lens II. Lens III is of concave plano construction and is separated from lens II by separator ring 28. It will be noted that the convex surface of lens II while complementary to the concave surface of lens III is not in abutting relation thereto, but is slightly spaced therefrom, for a reason soon to be explained. Separator ring 28 is placed between the tapered surface of lens II and an angularly cut surface in lens III.

Spaced from lens III, is a second set of lens triplets consisting of lenses IV, V and VI. Lens IV is concave convex in design and is in complementary juxtaposition with double convex lens V as a cemented doublet. Spacing washer or ring 30 separates convergent meniscus VI, with the apex of the concave face of the lens abutting lens V. Retaining ring 32 is threadedly mounted on flange 34 of outermost barrel member 36. It will be noted from inspection of Fig. 1 that casing 16 consists of three barrel members joined together in predetermined spaced relation; barrel member 36 being firmly retained in spaced relation to barrel member 38 by means of intermediate barrel member 40. External snap ring 42 and set screw 44 keep barrel mount 34 in aligned position on small barrel means 40. An internal snap ring 46 is received in a recess on barrel 40 in close proximity to an annular lens backing flange 48 of lens mount 36.

Barrel 38 is internally threaded along a portion of its inner surface adjacent to intermediate barrel member 40 and receives therein the lens assembly retaining nut 50 as well as flange 52 of barrel 40. Thus, the separate sections of positive lens assembly 12 are mounted in desired relation and yet are easily adapted to be adjusted with respect to each other, or for disassembly when necessary.

Stop ring 54 is mounted between flange 48 and intermediate barrel member 46 and includes diaphragm actuating ring 56 and the diaphragm 58. Ring 54 and diaphragm actuator 56 are held for joint rotation by reason of fork 60 engaging extension 62 on diaphragm ring 56.

To adjust the diaphragm, or stop, in accordance with operating conditions, ring 54 is rotated after sufficient force is applied to unseat ball means 64 against the outward urge of detent spring 66. Focusing of the lens is accomplished by moving the entire lens 10, in relation to the film and object by external means of conventional construction.

Figs. 5 and 6 illustrate the objective described above and includes the data for one example thereof, with $f=10.16$ mm.

| Element | ND | V | Radii | Separations |
| --- | --- | --- | --- | --- |
| I | 1.6086 | 58.9 | $R_1 = -20.000 \pm .030$ | $t_1 = .200 \pm .003$ |
|  |  |  | $R_2 = -4.058 \pm .004$ | $s_1 = .004$ |
| II | 1.6086 | 58.9 | $R_3 = 2.796 \pm .0015$ | $t_2 = .430 \pm .003$ |
|  |  |  | $R_4 = -2.337 \pm .001$ | $s_2 = .0215$ |
| III | 1.7195 | 29.2 | $R_5 = -2.240 \pm .001$ | $t_3 = .160 \pm .003$ |
|  |  |  | $R_6 = \infty$ | $s_3 = 1.400$ |
| IV | 1.6880 | 31.0 | $R_7 = -25.000 \pm .030$ | $t_4 = .160 \pm .003$ |
| V | 1.6086 | 58.9 | $R_8 = 3.875 \pm .005$ | $t_5 = .300 \pm .003$ |
|  |  |  | $R_9 = -7.000 \pm .008$ | $s_4 = .004$ |
| VI | 1.6086 | 58.9 | $R_{10} = 2.030 \pm .003$ | $t_6 = .300 \pm .003$ |
|  |  |  | $R_{11} = 13.040 \pm .010$ |  |

The component lens elements are numbered by Roman numerals in the direction towards the film surface. The second column gives the refractive indices N for the sodium D line of the spectrum and the third column gives the dispersive indices V or Abbe's number. The radii of curvature R of the lens surfaces are numerically listed from $R_1$ to $R_{11}$, with the thickness $t$, and air spaces $s$ being enumerated in the last column. The tolerances for the individual lenses are indicated adjacent the radius of curvature. The + and − signs indicate surfaces respectively convex and concave to the front and $R\infty$ indicates a plane surface.

Adjacent surfaces $R_4$ and $R_5$ are so designed that any variation of $R_4$ will be balanced by a similar variation of $R_5$ in the same direction. In this manner, a completely satisfactory lens system is available, as any variations in the lens are compensated for.

As was previously mentioned, casing 16 is joined to the negative lens casing 18 in predetermined distance to provide for suitable spacing of the two components. Lens components VII, VIII, IX, X and XI are mounted in a reverse stepped arrangement to produce the wide angle image desired.

Spacing ring 90 is mounted on casing 18 and is held in place by screws 92. Outermost lens VII is of plano concave design and is the largest lens of the device. Lens VII is mounted in an L-shaped flange 94 of the stepped construction of casing 18 and is held in fixed position by means of a threaded engagement at 96 between flange 94 and external retaining ring 98. A cushioning sealing gasket 100 is interposed between lens VII and ring 98, as shown in Fig. 1. Cemented lens doublet VIII and IX is mounted anteriorly of lens VII in a second L-shaped flange 102 of casing 18 in a manner similar to flange 94, but of smaller diameter. Lens VIII is of double convex design with the rear surface thereof coincident with one surface of double concave lens IX as a cemented doublet. A large internal nut 104 is threadedly held on flange 102 to maintain doublet VIII and IX stationary and in fixed relation to lens VII and a second lens doublet X and XI. Gasket 106 is retained between lens VIII and nut 104 to provide a sealing cushion as well as a non-marring buffer for the lens face. Spaces 108 and 110 separate lens VII and lens X from the intermediate doublet lenses VIII and IX respectively. Lens X is of double convex construction and is coincident with the outer concave surface of the double concave construction of lens XI as a cemented doublet. This latter lens doublet is similar to that of lenses VIII and IX, although of small size and is retained in a short L-shaped portion of casing 18 by means of inner retaining ring 112 and sealing gasket 114. The construction of the lens units and their radii and spacing is determined in relation to the indices of the glass used.

In obtaining the best image possible, it is necessary to slightly adjust the relative position of the lens components of the negative objective 14. This is made possible by the particular construction of lenses VII and IX. The periphery of these lenses are polished to obtain a plane surface 116 which is adapted to abut against the vertical legs of the L-shaped mounting portions of casing 18. These legs are bored horizontally to receive cap screws 118 therein, and with the ends of stems 120 engaging plane surfaces 116. On the initial assembly of the camera lenses, adjustment may be necessary. Cap screws 118 are rotated slightly in either direction until the desired results are obtained. Once this adjustment is made and the camera is properly focused, the lenses are fixed for all uses of the camera. As only slight adjustment is necessary, the gaskets interposed between the outer periphery of the lens and the ring retaining means will be compressed against the force of the pressure of the adjusting screws.

Figs. 3 and 4 illustrate an example of the negative objective described above, with $f=10.16$ mm.

| Element | ND | V | Radii | Separations |
| --- | --- | --- | --- | --- |
| VII | 1.6106 | 58.8 | $R_{12} = \infty$ | $t_7 = .300 \pm .005$ |
|  |  |  | $R_{13} = 2.950 \pm .003$ | $s_5 = .800$ |
|  |  |  | $R_{14} = 4.719 \pm .005$ | $t_8 = 1.100 \pm .005$ |
| VIII | 1.7195 | 29.2 | $R_{15} = -13.500 \pm .030$ | $t_9 = .200 \pm .005$ |
| IX | 1.6106 | 58.8 | $R_{16} = 2.038 \pm .0015$ | $s_6 = .800$ |
|  |  |  | $R_{17} = 25.707 \pm .040$ | $t_{10} = .750 \pm .005$ |
| X | 1.7195 | 29.2 | $R_{18} = -2.950 \pm .005$ | $t_{11} = .200 \pm .005$ |
| XI | 1.6106 | 58.8 | $R_{19} = 2.110 \pm .0015$ |  |

The component lens elements are numbered in a direction away from the screen. The columns listed provide the data as enumerated with respect to the positive lens objective, with the specific values for the negative lenses being given.

The lens components are mounted in their respective casings after having been previously suitably adjusted. In the preferred embodiment of the invention, objective 12 is about 6.8 inches away from objective 14 with the overall length of the lens system about 15.75 inches. The maximum diameter of the lens mount then is about 8.75 inches and tapers to about 2.5 inch diameter. In focusing lens 10, the negative and positive components are moved as a unit with respect to the focal plane. This method has been found to be best as it will least interfere with the correction of the lens aberrations. The effective focal length is approximately 0.4 inch at the front and the back focus, from the film to the nearest glass surface of the lens, is about 1.5 inches, with an aperture of $f/2.2$. The total field angle is 142 degrees. Obviously, the above represents a specific example of the lens designed for use in a 35 mm. motion picture camera system. Variations in details may be readily made, where desired, to adapt the basic design to 16 mm. and 8 mm. motion picture projectors, or to still cameras of all sizes. Variations in scale and this focal length are limited only by sizes of glass and grinding facilities. Variations of aperture will also permit further variations in size and positive to negative component spacing.

The wide angle lens of the above described invention is adapted to be used with a motion picture camera suitably modified to receive the lens, or can be used with the projector. Both real aircraft photography as well as photography of synthetic images attacks are possible by means of the lens.

Obviously many modifications and variations of the present invention are possible in the light of the above teachings. It is therefore to be understood that within the scope of the appended claims the invention may be practiced otherwise than as specifically described.

What is claimed is:

1. A photographic objective negative member comprising five lens elements in axial alignment forming three separated components and made substantially according to the specifications in the following table:

| Element | ND | V | Radii | Separations |
|---|---|---|---|---|
| I | 1.6106 | 58.8 | $R_{12}=\infty$ | $t_7=.300\pm.005$ |
|   |        |      | $R_{13}=2.950\pm.003$ | $s_8=.800$ |
| II | 1.7195 | 29.2 | $R_{14}=4.719\pm.005$ | $t_8=1.100\pm.005$ |
|    |        |      | $R_{15}=-13.500\pm.030$ | $t_9=.200\pm.005$ |
| III | 1.6106 | 58.8 | $R_{16}=2.038\pm.0015$ | $s_9=.800$ |
|     |       |       | $R_{17}=25.707\pm.040$ | $t_{10}=.750\pm.005$ |
| IV | 1.7195 | 29.2 | $R_{18}=-2.950\pm.005$ | $t_{11}=.200\pm.005$ |
| V | 1.6106 | 58.8 | $R_{19}=2.110\pm.0015$ | | where N and V are the refractive indices for the sodium D spectral line and the dispersive indices respectively of the corresponding lens elements numbered by Roman numerals in the first column in order from the front to rear of the objective, and where R, $t$ and $s$ are radii of curvature, thicknesses of lens elements, and spaces between components, each numbered from front to rear and $+$ and $-$ values of the radii indicating surfaces respectively convex and concave.

2. A photographic objective positive member comprising six lens elements in axial alignment forming two separated components each having three lens elements and made substantially according to the specifications in the following table:

| Element | ND | V | Radii | Separations |
|---|---|---|---|---|
| I | 1.6086 | 58.9 | $R_1=-20.000\pm.030$ | $t_1=.200\pm.003$ |
|   |        |      | $R_2=-4.058\pm.004$ | $s_1=.004$ |
| II | 1.6086 | 58.9 | $R_3=2.796\pm.0015$ | $t_2=.430\pm.003$ |
|    |        |      | $R_4=-2.337\pm.001$ | $s_2=.0215$ |
| III | 1.7195 | 29.2 | $R_5=-2.240\pm.001$ | $t_3=.160\pm.003$ |
|     |        |      | $R_6=\infty$ | $s_3=1.400$ |
| IV | 1.6880 | 31.0 | $R_7=-25.000\pm.030$ | $t_4=.160\pm.003$ |
|    |        |      | $R_8=3.875\pm.005$ | |
| V | 1.6086 | 58.9 | $R_9=-7.000\pm.008$ | $t_5=.300\pm.003$ |
|   |        |      |                     | $s_4=.004$ |
| VI | 1.6086 | 58.9 | $R_{10}=2.030\pm.003$ | $t_6=.300\pm.003$ |
|    |        |      | $R_{11}=13.040\pm.010$ | | where N and V are the refractive indices for the sodium D spectral line and the dispersive indices respectively of the corresponding lens elements numbered by Roman numerals in the first column in order from the front to rear of the objective, and where R, $t$ and $s$ are radii of curvature, thicknesses of lens elements, and spaces between components, each numbered from front to rear and $+$ and $-$ values of the radii indicating surfaces respectively convex and concave.

3. A lens system comprising a rear positive member, and a spaced apart, axially aligned front negative member; said rear positive member consisting of six lens components, said lenses being arranged as a pair of lens triplets, and said front negative member consisting of five lens components, said lenses being arranged as a pair of doublets and a single len; a casing enclosing said positive and negative members, said casing having seating means therein to retain said members in position relative to each other, and means extending through said casing and abutting said lens components whereby said means are adjustable to move the lens components relative to each other in order to provide the best image in the lens system.

4. A lens system comprising a rear positive member and a spaced apart, axially aligned front negative member, said rear positive member consisting of six lens components, said lenses being arranged as a pair of lens triplets, and said front negative member consisting of five lens components arranged in reverse stepped relation of increasing diameter as a pair of doublets and an outer, single lens; a casing enclosing said positive and negative members, said casing having seating means therein to retain said members in position relative to each other, a plurality of flanges in said casing, adjusting means extending through said flanges and casing and abutting said lens components on their surfaces to adjust the distance between selected lenses by moving said lenses retained in said seats.

5. The combination of claim 4 wherein said adjusting means includes transverse bores extending through said flanges and adjusting screws operatively retained in said bores and abutting said lens surfaces, whereby rotation of said screws will move the lenses in their seats relatively to each other.

6. The combination of claim 4, wherein the overall length of the lens system is about 15.75 inches and the air space between the rear positive member and the front negative member is about 6.8 inches.

7. The combination of claim 6 wherein the total field angle is about 142 degrees with a lens aperture of $f/2.2$ and the effective focal length of front negative member is less than 0.5 inch.

References Cited in the file of this patent

UNITED STATES PATENTS

| | | |
|---|---|---|
| 1,863,099 | Bowen | June 14, 1932 |
| 1,897,262 | Kitroser | Feb. 14, 1933 |
| 1,910,492 | Mellor | May 23, 1933 |
| 1,955,590 | Lee | Apr. 17, 1934 |
| 1,996,054 | Bowen | Apr. 2, 1935 |
| 2,008,991 | Nowack | July 23, 1935 |
| 2,247,068 | Richter | June 24, 1941 |
| 2,535,115 | Back et al. | Dec. 26, 1950 |

FOREIGN PATENTS

| | | |
|---|---|---|
| 18,121 | Great Britain | of 1907 |
| 225,398 | Great Britain | Dec. 4, 1924 |
| 461,554 | Great Britain | Feb. 18, 1937 |